United States Patent [19]

Mead

[11] Patent Number: 5,708,473
[45] Date of Patent: Jan. 13, 1998

[54] TWO STAGE VIDEO FILM COMPRESSION METHOD AND SYSTEM

[75] Inventor: Donald Mead, Carlsbad, Calif.

[73] Assignee: Hughes Aircraft Company, Los Angeles, Calif.

[21] Appl. No.: 298,507

[22] Filed: Aug. 30, 1994

[51] Int. Cl.$^6$ ..................................................... H04N 7/32
[52] U.S. Cl. ............................ 348/416; 348/699; 382/244
[58] Field of Search ..................................... 348/384, 409, 348/413, 415, 416, 420, 699, 390, 410–412; 382/232, 236, 238, 244–247; H04N 7/137

[56] References Cited

U.S. PATENT DOCUMENTS

| | | | |
|---|---|---|---|
| 4,661,849 | 4/1987 | Hinman | 348/416 |
| 4,849,810 | 7/1989 | Ericsson | 348/416 |
| 5,267,334 | 11/1993 | Normille et al. | 348/409 |
| 5,283,646 | 2/1994 | Bruder | 348/415 |
| 5,309,232 | 5/1994 | Hartung et al. | 348/384 |
| 5,367,385 | 11/1994 | Yuan | 348/420 |
| 5,414,469 | 5/1995 | Gonzales et al. | 348/416 |

*Primary Examiner*—Richard Lee
*Attorney, Agent, or Firm*—P. Y. Price; T. Gudmestad; W. K. Denson-Low

[57] ABSTRACT

Methods and systems for encoding data representative of a sequence of video frames for transmission to a decoder. A motion compensated predictive coder (24) substantially losslessly compresses the data, computes a motion vector, and forms an intermediate coded representation which includes the compressed data and the motion vector. A frame detector (26), which detects frames having a prediction error which exceeds a predetermined threshold, is coupled to the motion compensated predictive coder (24). A digital storage device (22) is coupled to the motion compensated predictive coder (24) and the frame detector (26). The digital storage device (22) stores the intermediate coded representation and stores a representation of the frames having the prediction error which exceeds the predetermined threshold. A lossless decoder (29), coupled to the digital storage device (22), substantially losslessly decodes the intermediate coded representation to form a decoded representation. A recoder (28), which compresses the decoded representation at a compression ratio in dependence upon a selectable bit rate for transmission, is coupled to the digital storage device (22) and the lossless decoder (29).

17 Claims, 2 Drawing Sheets

TWO STAGE VIDEO FILM COMPRESSION METHOD AND SYSTEM

TECHNICAL FIELD

The present invention relates generally to methods and systems for video signal processing, and more particularly, to methods and systems for encoding and decoding digital video signals.

BACKGROUND OF THE INVENTION

The ultimate use of digital video is seldom known at the time of origination. With analog systems, high quality recording equipment is used in the hope that successive generation losses imposed by post-processing and distribution will not be severe. Ideally, the production format is optimized for alteration and transcoding, e.g. component video or 35 mm film is employed. Regardless of the format, each editing or processing step adds noise and may degrade resolution.

Digital storage of video signals is preferred over analog storage in that a digital signal can be preserved losslessly. However, when the video is compressed in a lossy manner to save storage space or transmission bandwidth, the quality of the resulting images are irreversibly sacrificed. JPEG (Joint Photographic Experts Group) and MPEG (Motion Picture Experts Group) are two examples of video compression coding schemes.

MPEG-2 is a generic standard originally designed for interactive retrieval from a storage medium, and later extended to suit the demands of broadcast distribution. The MPEG-2 algorithm is based on a motion-compensated loop structure, wherein a discrete cosine transform (DCT) is used to remove spatial correlation before quantization and entropy coding.

The MPEG-2 syntax defines a bit stream having six hierarchical layers delimited by corresponding headers. A sequence layer defines global parameters, such as picture dimension, frame rate, and transmission parameters. A group of pictures (GOP) layer provides the capability of random access to any point of the sequence with a granularity of a prespecified number of frames. A picture layer comprises a single frame which defines parameters, such as picture type and temporal reference, specific to the single frame. A slice layer enables data packetization in the bit stream. The slice header is aligned on a byte boundary which constitutes the lowest level entry point in the bit stream in case of a loss of synchronization. A macroblock layer is comprised of macroblocks which constitute the processing units for motion estimation and compensation. Several parameters specific to each macroblock, such as macroblock type and its motion vectors, are specified in its header. A block layer, comprised of 8×8 blocks of pixel data, is the processing unit for the DCT.

Three types of frames are defined by MPEG-2. An intra-frame (I-frame) is one which is coded without reference to any other neighboring frames, i.e. without motion estimation and compensation. As a result, I-frames can be decoded on their own. A predicted frame (P-frame) is one which is motion compensated with reference to the most recently transmitted I-frame or P-frame, with the resulting prediction error being coded. A bidirectional frame (B-frame) is one which is motion compensated with reference to both a past and future I-frame or P-frame.

Input frames are usually grouped in GOPs which start with an I-frame and contain a number of P-frames and B-frames. Since the coding of each B-frame requires motion compensation with reference to a future I-frame or P-frame, the concept of transmission order, as opposed to display order, was introduced in MPEG. For transmission, all of the pictures that are used as references for motion compensation of a B-frame are sent before the B-frame.

A macroblock from a P-frame or a B-frame can be one of several types. A P-frame macroblock is coded as "intra" if no motion compensation is performed, and "inter" if motion compensation is performed. A B-frame macroblock can also be classified in the same way. Additionally, if a B-frame is classified as "inter", it can be: (i) forward predicted if only a previous frame is used for prediction, (ii) backward predicted if only a frame from the future is used for prediction, and (iii) interpolative predicted if both a previous frame and a future frame are used for prediction.

In many applications, a digitally-stored sequence of images is to be transmitted to many different users, wherein the users are equipped with decoders of different complexities, e.g. having different bit rates. The different decoder complexities result from differences in communication channel bandwidth, display device capabilities, and economic constraints, to name a few. One approach to this distribution application is to employ various MPEG-2 encoders, each having a different bit rate, in parallel to provide the images to the different users. A shortcoming of this approach is in the excessive computational expense which results from encoding at each of the desired bit rates. Further, in order to provide up to a substantially lossless encoding of the sequence of images, the images must be stored in a device having a large storage capacity. For example, the storage of a 2 hours-long digital movie with 30 frames per second, CCIR 601 resolution (480 lines of 720 pixels), and 24 bit per pixel requires a storage capacity of approximately 224 Gbytes (uncompressed).

SUMMARY OF THE INVENTION

It is thus an object of the present invention to provide a digital video encoder which allows each user to select a desired picture quality.

A further object of the present invention is to provide a digital video encoder capable of providing up to a substantially lossless or completely lossless reconstruction.

A still further object of the present invention is to provide a digital video encoder suited for the distribution of movies from a central database.

Another object of the present invention is to use a priori knowledge of the content of digital video data in the encoding process.

Yet another object of the present invention is to provide a digital video encoder capable of providing bit streams at different bit rates.

In carrying out the above objects, the present invention provides a system for encoding data representative of a sequence of video frames. A first coder losslessly compresses the data to form an intermediate coded representation. A digital storage device is coupled to the first coder to store the intermediate coded representation. A second coder forms an encoded representation of the data by compressing the stored intermediate coded representation at a selectable compression ratio.

Further in carrying out the above objects, the present invention provides a method for encoding data representative of a sequence of video frames. The data is losslessly compressed to form an intermediate coded representation.

The intermediate coded representation is stored. The stored intermediate representation is compressed at a selectable compression ratio to form an encoded representation of the data.

Still further in carrying out the above objects, the present invention provides a system for encoding data representative of a sequence of video frames for transmission to a decoder. A motion compensated predictive coder substantially losslessly compresses the data, computes a motion vector, and forms an intermediate coded representation which includes the compressed data and the motion vector. A frame detector is coupled to the motion compensated predictive coder to detect frames having a prediction error which exceeds a predetermined threshold. A digital storage device is coupled to the motion compensated predictive coder and the frame detector. The digital storage device stores the intermediate coded representation and stores a representation of the frames having the prediction error which exceeds the predetermined threshold. A lossless decoder, coupled to the digital storage device, substantially losslessly decodes the intermediate coded representation to form a decoded representation. A recoder, which compresses the decoded representation at a compression ratio in dependence upon a selectable bit rate for transmission, is coupled to the digital storage device and the lossless decoder. A preload coder, coupled to the digital storage device, transmits encoded data representative of high activity frames during a period of low transmission activity.

These and other features, aspects, and advantages of the present invention will become better understood with regard to the following description, appended claims, and accompanying drawings.

BEST MODES FOR CARRYING OUT THE INVENTION

Figure 1:
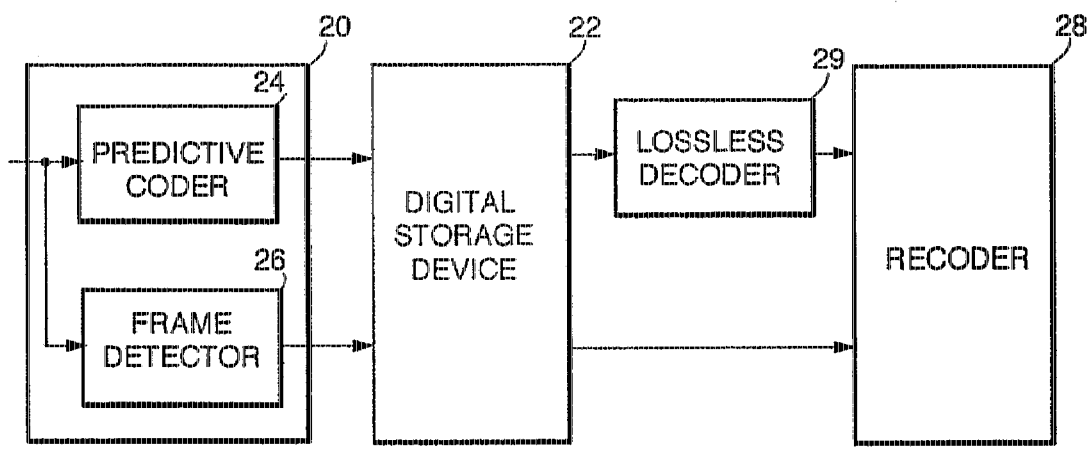
FIG. 1 is a block diagram of an embodiment of a two-stage encoder.

A block diagram of an embodiment of a two-stage encoder of the present invention is illustrated in FIG. 1. A first coder stage 20 provides an intermediate lossless representation of data representative of a sequence of one or more frames of video or film footage. The intermediate lossless representation is stored in a digital storage device 22, which is coupled to the first coder stage 20. As a result of storing the intermediate lossless representation, a reduced storage capacity is required in the digital storage device 22 while maintaining the integrity of the data. In a preferred embodiment, the first coder stage 20 further extracts characteristics of the data, such as local activity and location of frames which are difficult to code, and stores these characteristics in the digital storage device 22.

More specifically, the first coder stage employs a predictive coder 24 to compress the data to form the intermediate representation. In a preferred embodiment, the predictive coder is based upon a motion-compensated predictive coder, wherein a motion vector is computed for each of the macroblocks and stored in the digital storage device 22. Regardless of the specific type of predictive coder 24 employed, a resulting prediction error signal is losslessly encoded for storage in the digital storage device 22. A frame detector 26 is employed to detect frames having a prediction error which exceeds a predetermined threshold. A representation of these frames, hereinafter referred to as hard-to-code frames, is stored in the digital storage device 22.

A second coder stage 28, which acts as a recoder, is coupled to the digital storage device 22. The second coder stage 28 includes one or more recoders, each working at desired bit rates, which uses the characteristics collected in the first coder stage 20 to achieve a high coding efficiency of the data. In a preferred embodiment, the second stage comprises a bank of MPEG-2 based encoders operating at different bit rates and using the motion vector field previously stored. The second coder stage 28 provides larger compression ratios than the first stage 20, however, at the cost of some loss in data integrity. In a preferred embodiment, the second coder stage 28 is coupled to the digital storage device 22 by a lossless decoder 29 interposed therebetween. The lossless decoder 29 losslessly decodes the intermediate coded representation to form a decoded representation. Some embodiments of the lossless decoder may only have to remove a variable length code which is used to minimize the entropy of the intermediate representation.

Figure 2:
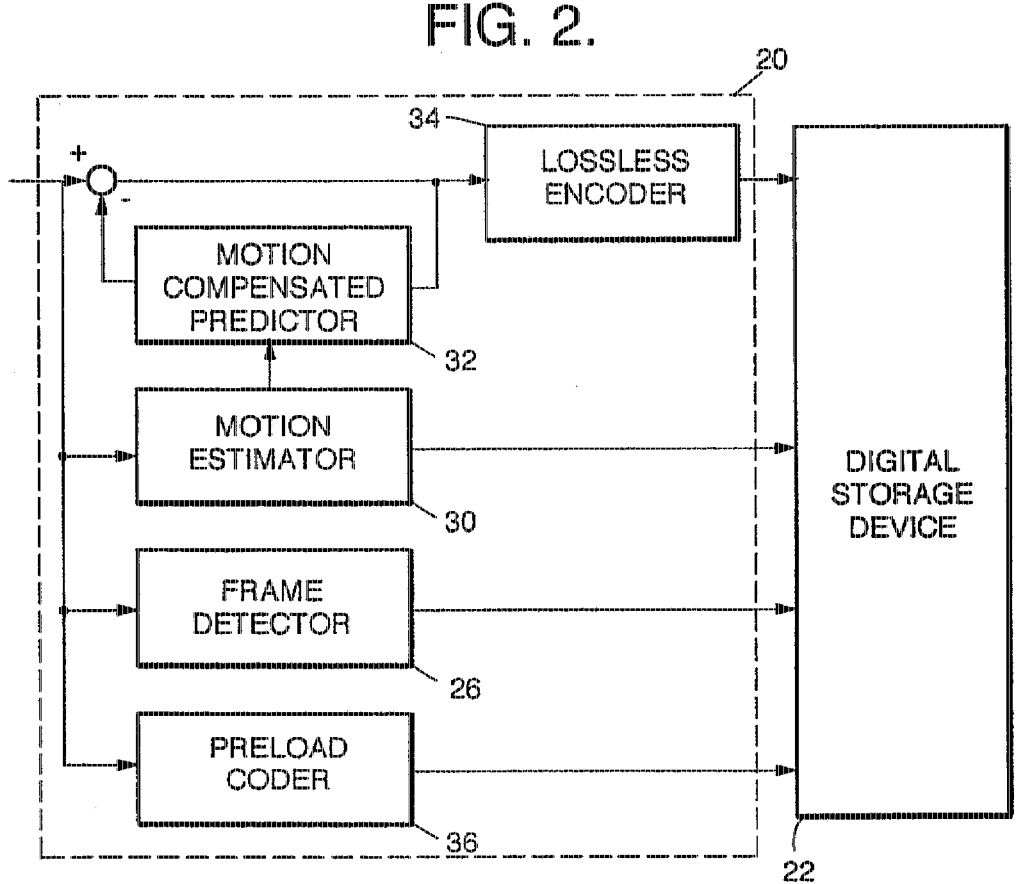
FIG. 2 is a block diagram of an embodiment of the first coder stage in accordance with the present invention.

An embodiment of the first coder stage 20 is illustrated by the block diagram of FIG. 2. The input data representative of one or more frames of video or film footage is applied to a motion estimator 30. The general concept of motion estimation is to find the location of each moving object in a previous frame. Once the location is found, the previous image can be warped, i.e. motion compensated, in order to reduce the prediction error. The procedure of motion estimation originates some side information, namely the motion parameters which describe the warp, which are transmitted so that a decoder can perform the same operation as the encoder. Since pixels belonging to the same object have similar motion, this side information can be coded without a significant increase of the total bit rate.

The motion estimator 30 can employ various approaches. One approach is to perform a segmentation of the sequence of frames into objects, followed by finding the motion parameters associated with each object. Another approach includes the steps of splitting each frame into a set of blocks of pixels and motion compensating each of these blocks. A widely-used approach to perform block-based motion estimation is a block matching technique. For each input block, the encoder searches for the closest match in the previous frame. The measure of similarity between the current and the block candidate for prediction is based on either a sum of squared error measure or a sum of absolute differences measure.

In one realization, a two-step procedure is employed in the motion estimator 30. First, the best match with integer-pel accuracy is found by an exhaustive search on a window of a prespecified size. Then, a half-pel motion vector refinement is found through a search in a window of ±½ pixel in each dimension, centered on the position of the best integer-pel match. The samples associated with half-pel displacements are obtained by linear interpolation of the neighboring pixels. It is noted that other lossless and substantially lossless techniques can be employed to perform spatial decorrelation.

In general, the motion estimation can be performed either between original images or between an original image and a previously coded image. A more accurate estimation results by using the original images in that the originating motion vectors are closer to the real motion of the input sequence. A less accurate estimate results when using the previously coded image, however the prediction error is reduced.

An output of the motion estimator 30 is applied to the digital storage device 22. Through this connection, the motion vectors computed by the motion estimator 30 are stored in the digital storage device 22. Another output of the motion estimator 30 is applied to a motion compensated predictor 32. The motion compensated predictor 32 is employed to reduce the temporal redundancy existent in a video sequence. The output of the motion compensated predictor 32 is applied to a lossless encoder 34, which provides an intermediate coded representation for storage in the digital storage device 22.

As in MPEG-2, the coded frames are divided into three groups according to the type of motion compensated prediction used for their encoding, namely I-frames, P-frames, and B-frames. A difference to MPEG-2 is that, in a lossless scheme, the DCT is not used for spatial decorrelation due to the requirement of finite-arithmetic precision for its practical implementation.

In I-frames, the smallest processing unit considered is a picture slice of 16 by 720 pixels. This processing unit provides a trade-off between coding efficiency and capacity to recover from errors originated by the storage media. The lossless coding algorithm used is based on intraframe prediction. For a given pixel X to be coded, the prediction P of X is given, outside the slice boundaries by $P=(A+B)/2$, where A designates the pixel immediately above X, and where B designates the previous pixel in the same line as X. Thus, in the first line of the slice, $P=B$, and in the first column of the slice, $P=A$. The predictor is initialized in the first pixel of the slice with the value of $P=128$. In this way, the propagation of any storage errors is limited to one slice. The prediction error given by the difference between X and P is Huffman coded using the table provided by MPEG-2 for the predictive encoding of the DCT DC-coefficients in intraframes.

In P-frames and B-frames, the smallest processing unit of the lossless encoder is a macroblock of 16 by 16 pixels. For each block, a spatial decorrelation operation similar to that used at the slice level on I-frames is applied to the temporal prediction error signal. Those blocks for which the motion estimation is not efficient are classified as intrablocks, and for these blocks, the temporal decorrelation operation is applied to the image pixels. The prediction error residuals are encoded with the above-mentioned Huffman table.

In order to increase the efficiency of the second coder stage 28, information which characterizes the video frames is extracted within the first coder stage 20. One such set of information is formed by identifying hard-to-code frames, or frames for which prediction fails, using the frame detector 26. Such a frame usually results from a mismatch between the coding model and the content of the images, as would occur during a scene change for example.

When a hard-to-code frame occurs, the use of motion-compensated prediction results in both a large prediction error and a highly non-smooth motion vector field. Encoding blocks of P-frames and B-frames as intra blocks can be used to attenuate the effect of the large prediction error. In a preferred embodiment, however, a new group of frames beginning with an I-frame is formed at each hard-to-code frame.

The degree of coding difficulty of a P-frame or a B-frame is measured using the following method. For each macroblock, the energy of the motion compensated prediction error is compared with that of the original pixel amplitudes in the macroblock. If the prediction error has smaller energy, the macroblock is classified as "inter", otherwise it is classified as "intra". If the number of intra macroblocks in the frame is greater than the number of inter macroblocks, then: a P-frame is coded as intraframe and a new GOP is started; and a B-frame is coded as interframe using only backward prediction, the next P-frame is coded as intraframe, and a new GOP is then started. If a hard-to-code frame coincides with an I-frame, no special action takes place.

Another footage characteristic operation is performed by a preload coder 36. Preload coding entails transmitting stills corresponding to high activity periods, either during low activity periods or prior to the beginning of transmission. These stills are used by a decoder as a basis for prediction when these high-activity periods occur, thus increasing the coding quality. The technique is used in conjunction with the method of processing hard-to-code frames since these frames are coded in intramode.

The preload coder 36 can be implemented by creating an additional bit stream of reduced size which incorporates the hard-to-code frames. The bit stream can be downloaded by the user before the start of transmission and stored locally. As the transmission progresses, the required hard-to-code frames are decompressed into a memory and used as needed. This process requires the existence of a memory in the decoder, such as a hard disk. An alternative implementation which avoids the requirement of the hard disk is based upon storing the additional bit stream in a CD-ROM which is provided to users in advance of a broadcast.

Figure 3:
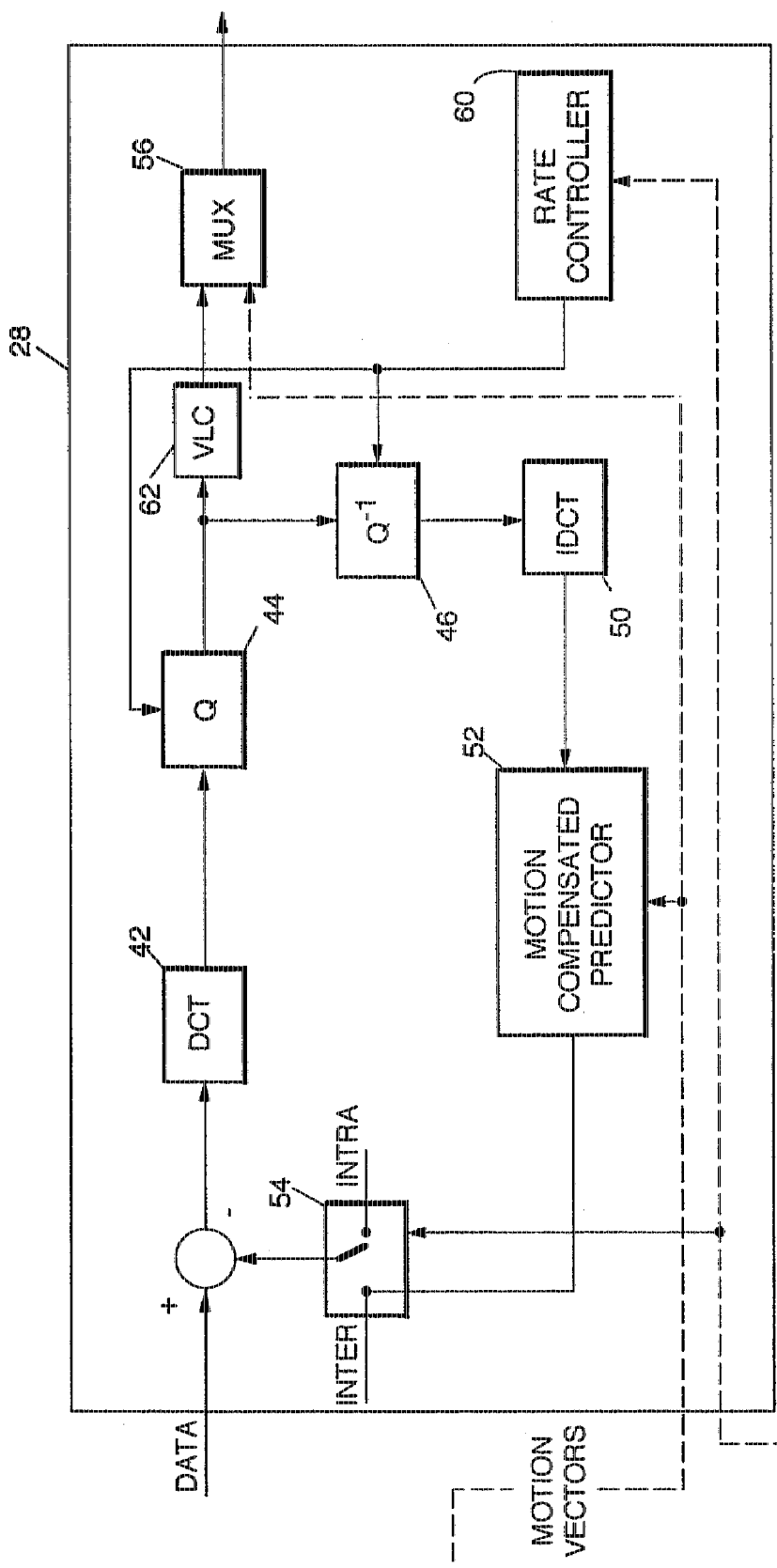
FIG. 3 is a block diagram of an embodiment of the second coder stage in accordance with the present invention.

An embodiment of the second coder stage 28 is illustrated by the block diagram in FIG. 3. As in MPEG-2, the second coder stage 28 applies the decoded intermediate representation of the data to a subtractor followed by a DCT 42, a uniform scalar quantizer (Q) 44 and variable length coder (VLC) 62 for processing in the spatial domain. In the temporal domain, the second coder stage 28 uses interframe motion compensation formed by a feedback loop comprising an inverse quantizer ($Q^{-1}$) 46, an inverse DCT 48, a motion compensated predictor 52, and a switch 54. The switch 54 is used for switching between inter and intra macroblocks. The motion vector field computed in the first coder stage 20 is used by the motion compensated predictor 52, and further is multiplexed into an output bit stream by a multiplexer 56. The footage characteristics collected by the first coder stage 20 are used to improve the encoding of hard-to-code frames, and in the formatting of the preloaded bit stream.

In order to maintain a constant encoding quality, a variable number of bits are assigned to different frames based upon the amount of activity therein. The variable bit allocation is achieved through the use of a channel buffer and a rate controller 60 which is able to maintain the instantaneous bit rate within the bounds imposed by the transmission capacity by introducing some feedback from the state of the buffer into the coding procedure. In the two-stage encoder, the characteristics of the footage acquired in the first stage 20 is used to achieve an improved bit allocation in the second stage. The lossless encoding can be considered as a first pass where information about the number of bits necessary to code each frame is collected.

The rate controller 60 for the two-stage encoder is implemented as follows. The target number of bits, T, for encoding a frame in the second stage 28 is selected to be:

$$T=W\ F\ R/(G-C)$$

where W is a weighting factor dependent upon the type of frame used, F is the number of bits required to encode the frame during the first stage, G is the number of bits spent on the lossless encoding of the GOP to which the frame belongs, and C is the number of bits required to losslessly encode all the frames in the GOP up to the frame. This target strategy is capable of providing a nonlinear bit allocation if required by the footage characteristics. For example, if the complexity of the first frame is such that it requires 50% of the total number of the GOP bits in the first stage, the target set for the second stage encoder will also be 50% of the available GOP bits. Once the targets are determined, the computation of the actual macroblock quantizers is carried out according to equations provided in the MPEG-2 test model, taking into account both the fullness of the transmission buffer and the local picture activity.

Two practical implementations of the two-stage encoder of the present invention are as follows. In a distributed configuration, a corresponding recoder is allocated to each user. As a result, each user has complete control over the transmission bit rate. Since the motion estimation and part of the decision making involved in the encoding process are performed in the first stage, the implementation of each recoder is only slightly more expensive than that of a standard MPEG-2 decoder. In a centralized configuration, a unique broadcast unit having a bank of recoders which cover a prespecified range of transmission bit rates feeds all of the users. In this configuration, the user is limited to choosing one of the prespecified rates, however, the system is less expensive.

The above-described versions of the present invention have many advantages. Through the use of embodiments of the present invention, a fileserver for a large movie database is capable of feeding several distribution outlets, each at a different bandwidth or bit rate. This allows each user to be provided with an image quality based upon the bandwidth which his communication path allows, the amount of money he is willing to pay, and the capabilities of his display device.

Another advantage results from storing motion vectors computed in the first coder stage. Since the motion vectors are independent of both the transmission bit rate and the coding quality, the motion estimation is performed once, in the first coder stage, and used for all of the different rate encoders in the second stage. Since motion estimation is typically the more expensive encoding step, a significant savings in computation time results in comparison to using various MPEG-2 coders in parallel.

A further advantage is that the storage requirement of the permanent files is significantly reduced. In practice, the first coder stage provides an average compression ratio greater than 1.8, and typically in the range of 2 to 5. Moreover, the permanent storage is lossless.

A still further advantage results from the first stage performing a bulk of the overall computation, such as the computation of motion vectors, in non-real time. As a result, the second stage can be simple and inexpensive to implement.

While the best mode for carrying out the invention has been described in detail, those familiar with the art to which this invention relates will recognize various alternative designs and embodiments for practicing the invention as defined by the following claims.

What is claimed is:

1. A system for encoding data representative of a sequence of video frames, the system comprising;

a first coder which losslessly compresses the data to form an intermediate coded representation and includes a predictive coder which compresses the data to form the intermediate coded representation;

a digital storage device, coupled to the first coder, which stores the intermediate coded representation;

a second coder, coupled to the digital storage device, which compresses the stored intermediate coded representation at a selectable compression ratio to form an encoded representation of the data; and a decoder, interposed between the digital storage device and the second coder, which decodes the stored intermediate coded representation for application to the second coder.

2. A system for encoding data representative of a sequence of video frames for transmission to a decoder, the system comprising:

a motion compensated predictive coder which losslessly compresses the data, the motion compensated predictive coder computing a motion vector and forming an intermediate coded representation which includes the compressed data and the motion vector;

a frame detector which detects frames having a prediction error which exceeds a predetermined threshold;

a digital storage device, coupled to the motion compensated predictive coder and the frame detector, which stores the intermediate coded representation and stores a representation of the frames having the prediction error which exceeds the predetermined threshold;

a lossless decoder, coupled to the digital storage device, which losslessly decodes the intermediate coded representation to form a decoded representation;

a recoder, coupled to the digital storage device and the lossless decoder, which compresses the decoded representation at a compression ratio in dependence upon a selectable bit rate for transmission; and a preload coder, coupled to the digital storage device, which transmits encoded data representative of high activity frames during a period of low transmission activity.

3. A method of encoding data representative of a sequence of video frames, the method comprising the steps of:

losslessly compressing the data by applying the data to a predictive coder to form an intermediate coded representation;

storing the intermediate coded representation in a digital storage device;

compressing the stored intermediate coded representation at a selectable compression ratio to form an encoded representation of th data;

detecting frames having a prediction error which exceeds a predetermined threshold; and storing in said digital storage device a representation which indicates the frames having the prediction error which exceeds the predetermined threshold.

4. The method of claim 3 further comprising the step of transmitting the encoded representation of the data to a corresponding decoder via a communication channel.

5. The method of claim 3 wherein the step of losslessly compressing the data compresses the data at an average compression ratio greater than 1.8.

6. The method of claim 3 wherein the step of losslessly compressing the data includes the step of applying the data to a transform coder with lossless residual.

7. The method of claim 3 wherein the predictive coder is a motion compensated predictive coder.

8. The method of claim 7 further comprising the steps of:
computing a motion vector based upon the data; and
storing the motion vector.

9. A system for encoding data representative of a sequence of video frames, the system comprising:
- a first coder which losslessly compresses the data to form an intermediate coded representation and includes a predictive coder which compresses the data to form the intermediate coded representation;
- digital storage device, coupled to the first coder, which stores the intermediate coded representation;
- a second coder, coupled to the digital storage device, which compresses the stored intermediate coded representation at a selectable compression ratio to form an encoded representation of the data; and
- a frame detector coupled to the digital storage device which detects frames having a prediction error which exceeds a predetermined threshold, wherein a representation thereof is stored in the digital storage device.

10. The system of claim 9 wherein the first coder compresses the data at an average compression ratio greater than 1.8.

11. The system of claim 9 wherein the encoded representation of the data is transmitted to a corresponding decoder via a communication channel.

12. The system of claim 11 wherein the selectable compression ratio is based upon a selectable bit rate for transmission.

13. The system of claim 9 wherein the predictive coder is a motion compensated predictive coder which compresses the data to form the intermediate coded representation.

14. The system of claim 13 wherein the motion compensated predictive coder includes an entropy coder.

15. The system of claim 14 wherein the entropy coder includes a Huffman coder.

16. The system of claim 13 wherein the motion compensated predictive coder computes a motion vector, and wherein the motion vector is stored in the digital storage device.

17. The system of claim 16 wherein the second coder compresses the stored intermediate coded representation based upon the stored motion vector.

* * * * *